United States Patent [19]

Heisler

[11] 4,148,404
[45] Apr. 10, 1979

[54] AUTOMATIC LOADER AND UNLOADER

[75] Inventor: William C. Heisler, Monroe, N.C.

[73] Assignee: The Peelle Company, Bay Shore, N.Y.

[21] Appl. No.: 749,409

[22] Filed: Dec. 10, 1976

[51] Int. Cl.² .............................................. B65G 1/04
[52] U.S. Cl. .................................... 414/259; 414/280
[58] Field of Search ..... 214/95 R, 16.1 BD, 16.1 DC, 214/730; 294/116; 104/162, 172 S, 176, 211

[56] References Cited

U.S. PATENT DOCUMENTS

| 3,096,896 | 7/1963 | Norton et al. | 214/730 |
|---|---|---|---|
| 3,135,340 | 6/1964 | Robinsky | 294/116 |
| 3,318,469 | 5/1967 | Bigler | 214/95 R |
| 3,337,070 | 8/1967 | Guilbert, Jr. | 187/31 |
| 3,357,582 | 12/1967 | Wittek | 214/730 |
| 3,432,055 | 3/1969 | Guilbert, Jr. | 214/16.1 DC |
| 3,439,815 | 4/1969 | Wagner et al. | 214/730 |
| 3,792,758 | 2/1974 | Wentz | 214/730 |
| 3,854,616 | 12/1974 | Willis et al. | 214/730 |

Primary Examiner—Lawrence J. Oresky
Attorney, Agent, or Firm—McNenny, Pearne, Gordon, Gail, Dickinson & Schiller

[57] ABSTRACT

An automatic loader and unloader for an elevator includes a stationary frame, a main carriage movable in either direction relative to the stationary frame, and a coupler carriage movable in either direction relative to the main carriage. The main carriage is slidably disposed on the stationary frame by a bearing arrangement which provides a cantilever support for the main carriage when the main carriage is extended. The main carriage and the coupler carriage are extended and retracted by two pair of cables. One pair of cables effects movement of the main carriage and coupler carriage in one direction, and the other pair of cables effects movement of the main carriage and coupler carriage in the other direction.

20 Claims, 19 Drawing Figures

AUTOMATIC LOADER AND UNLOADER

BACKGROUND OF THE INVENTION

The present invention relates the automatic loader and unloader devices. More particularly, the invention relates to a device for automatically loading and unloading push carts in either direction relative to a freight elevator such as a dumb waiter.

The prior art has recognized that the use of freight elevators is enhanced by devices for automatically loading and unloading the elevator. Prior art loading and unloading devices for elevators are disclosed in U.S. Pat. Nos. 3,237,789, 3,337,070 and 3,447,704. Coupling devices for loading and unloading push carts on elevators are shown in U.S. Pat. Nos. 3,432,055 and 3,565,270.

SUMMARY OF THE INVENTION

The present invention departs from these and other prior art loading and unloading devices by providing a stationary frame, a main carriage longitudinally movable relative to the stationary frame, and a coupler carriage movable longitudinally in either direction relative to the main carriage. A bearing arrangement is provided between the stationary frame and the main carriage for supporting the main carriage in a cantilever manner when the main carriage is extended. Two pair of cable assemblies are provided for effecting movement of the main carriage relative to the stationary frame and movement of the coupler carriage relative to the main carriage.

The stationary frame includes two stationary longitudinally extending guide bars. A drive screw on the stationary frame extends longitudinally parallel to the stationary guide bars for moving a sheave carriage in either direction toward and away from a center position.

The main carriage includes four guide bars which reciprocate back and forth relative to the main frame and which are rigidly secured to end plates. Two of the guide bars are slidably secured to the stationary frame guide bars by bearing blocks. The other two guide bars provide a mounting for the coupler carriage.

The coupler carriage includes four coupler arms, each of which is spring biased to a closed position. Each coupler arm includes a first camming surface which moves the coupler arm to an open position when a pin is engaged on a cart that is to be loaded on the elevator. Each of the coupler arms also includes a second camming surface which moves the coupler arm to its open position when a cart which is to be unloaded has been removed from the elevator.

The bearing arrangement includes two bearing blocks each of which is slidably mounted on the stationary guide bars of the stationary frame and on the movable guide bars of the main carriage. The first bearing block is stationary on the frame when the main carriage moves in one direction and moves relative to the frame when the main carriage moves in the other direction. The second bearing block is movable on the frame when the main carriage moves in the one direction and is stationary on the frame when the main carriage moves in the other direction. The bearing blocks provide a cantilever support at points which are located a maximum distance from one another at all times as the main carriage is extended or retracted.

Each pair of cables includes a primary cable which extends around a sheave on the sheave carriage and which is connected at its ends to the stationary frame and to the main carriage so that movement of the sheave carriage by the motor-driven drive screw moves the main carriage. Each pair of cables also includes a secondary cable connected at its ends to the stationary frame and to the main carriage around a sheave on the coupler carriage for effecting movement of the coupler carriage when the main carriage is moved by the primary cable.

This arrangement provides a loading and unloading device in which close floor and cart leveling tolerances are not required and which can accommodate carts with relatively narrow lateral spacing of the cart wheels. Additionally, this arrangement provides a simple construction having an effective cantilever support of the extending main carriage and having relatively few variable parts required for machines of different axial length and stroke.

BRIEF DESCRIPTION OF THE DRAWINGS

These and other aspects of applicant's invention are more fully described below with reference to the accompanying drawings, wherein.

DETAILED DESCRIPTION OF THE DRAWINGS

Figure 1:
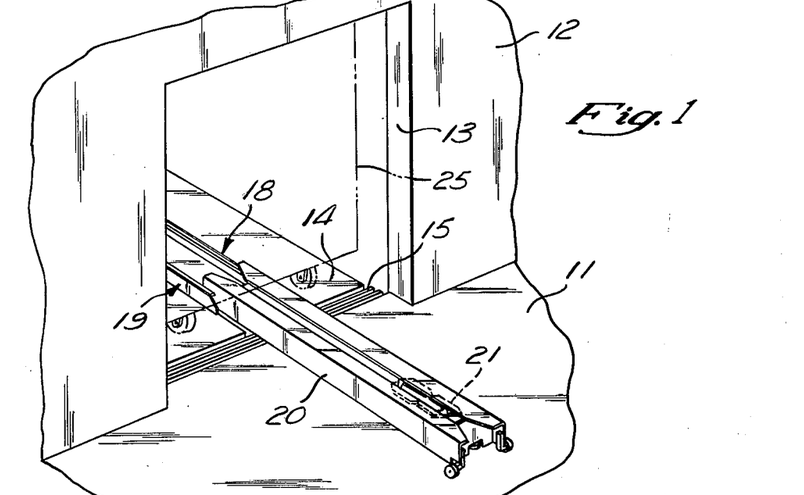
FIG. 1 is a schematic view of an automatic loading and unloading device according to applicant's invention, with the main carriage in an extended position to unload a cart from the elevator.

Referring now to the drawings in greater detal, FIG. 1 shows a building having a horizontal floor 11, a vertical wall 12, and an elevator shaft opening 13 in the wall 12. An elevator 14 is disposed in an elevator shaft in the building for vertical movement. Vertically slidable elevator doors 15 close the opening 13 when the elevator 14 is at another floor in the building.

An automatic loading and unloading device 18 is carried by the elevator 14. The loading and unloading device 18 includes a stationary frame 19, a major portion of which is located in a recess in the floor of the elevator 14. The loading and unloading device 18 also includes a main carriage 20 which is slidable relative to the stationary frame 19 and a coupler carriage 21 which is slidable relative to the main carriage 20. The main carriage 20 and coupler carriage 21 are shown in FIG. 1 in a fully extended position for engaging a cart (not shown) on the floor 11 prior to transferring the cart from the floor 11 to the elevator 14. A four wheel manual push cart 25 is shown in phantom in FIG. 1 on the elevator 14. Although the cart 25 would in actual practice be on the floor 11 rather than on the elevator 14 when the main carriage 20 and coupler carriage 21 are extended as shown in FIG. 1, the cart 25 is shown on the elevator 14 in FIG. 1 to illustrate the relationship between the elevator 14 and the loading and unloading device 18 and the cart 25.

Figure 2:
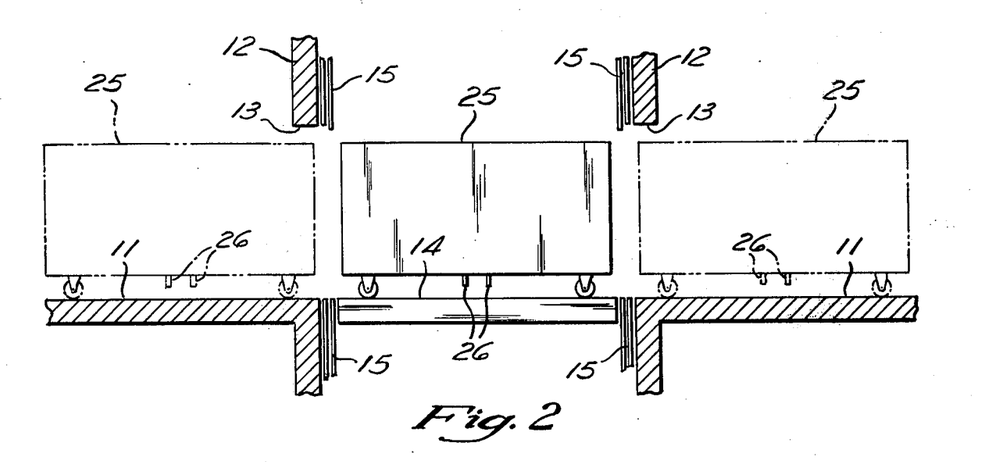
FIG. 2 is a schematic cross-sectional view showing an elevator with a cart in a loaded position and showing the unloaded position of the cart in phantom.

Referring now to FIG. 2, a cart 25 is shown in a loaded position on the elevator 24. The loading and unloading device 18 is omitted from FIG. 2 so that the details of the cart 25 may be shown. The cart 25 includes a frame supported by four wheels, two of which are suitably mounted by swivels or castors for steering the cart 25. The cart 25 also includes two cart transfer pins 26 spaced a predetermined distance from one another and disposed along a longitudinal axis of the cart 25. As explained further below, the cart pins 26 are captured by the coupler carriage 21 of the loading and unloading device 18 when the cart 25 is to be transferred between the elevator 14 and the floor 11. As also shown schematically in FIG. 2, the cart 25 may be unloaded from the elevator 14 either to the left or to the right.

Figure 3:
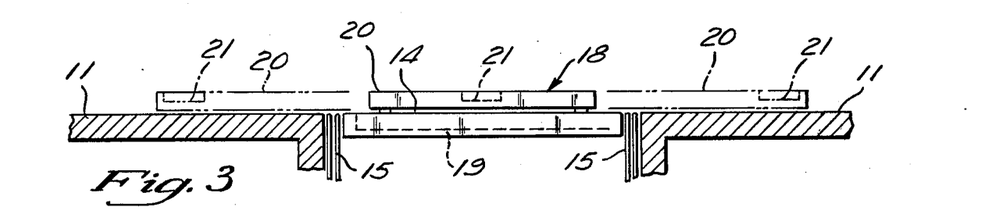
FIG. 3 is a cross-sectional view similar to FIG. 2 but showing the loading and unloading device in a center position and showing the extended positions of the main carriage and coupler carriage in phantom.

Referring now to FIG. 3, the movement of the loading and unloading device 18 is shown schematically. When the device 18 is in a center or neutral position as shown by solid lines, the main carriage 20 is centered vertically above the stationary frame 19. Additionally, the coupler carriage 21 is in a center position relative to the main carriage 20. In actual use, if the cart such as the cart 25 were disposed on the elevator 14 as shown in FIG. 3, the transfer pins 26 of the cart 25 would be captured by the centered coupler carriage 21 of the loading and unloading device 18.

Still referring to FIG. 3, the cantilever mounting of the main carriage 20 relative to the stationary frame 19 is shown in phantom. When the main carriage 20 moves to the right relative to the stationary frame 19, the coupler carriage 21 also moves to the right relative to the main carriage 20. similarly, when the main carriage 20 moves to the left relative to the stationary frame 19, the coupler carriage 21 moves to the left relative to the main carriage 20. As explained further below, the main carriage 20 and coupler carriage 21 are extended a slight distance more to the left or the right when a cart is removed from the elevator 14 than when a cart is to be captured and moved onto the elevator 14.

Figure 4:
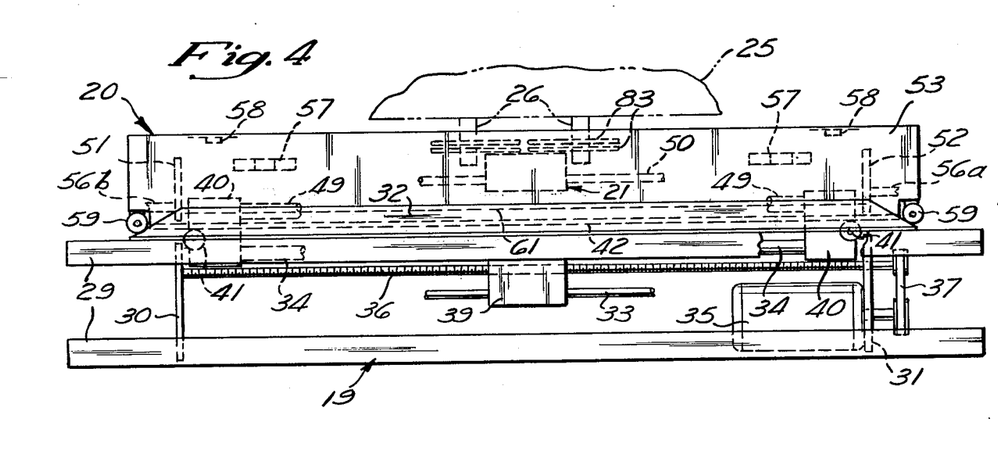
FIG. 4 is a side elevational view of the loading and unloading device, with a portion of a cart shown in phantom outline.
Figure 5:
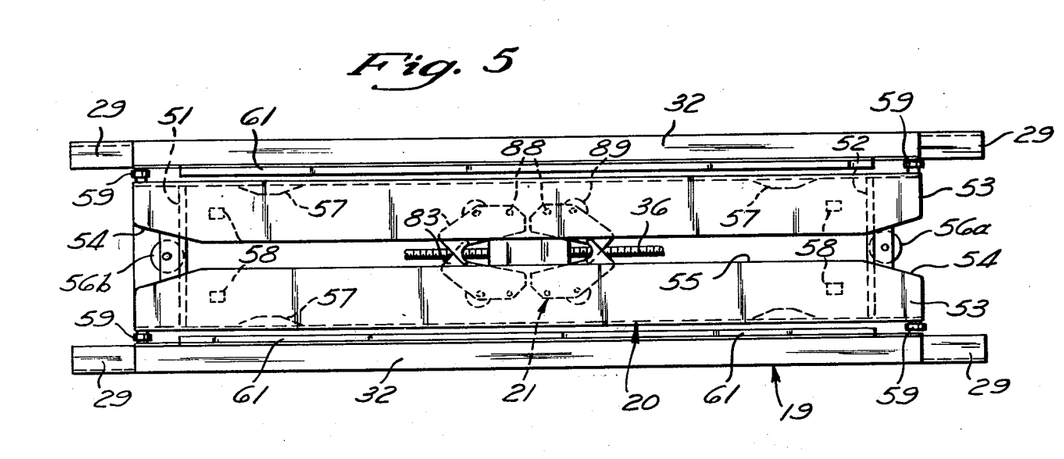
FIG. 5 is a top plan view of the loading and unloading device.
Figure 6:
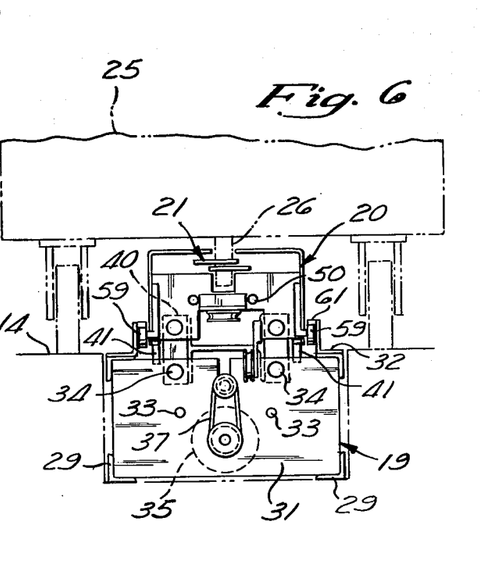
FIG. 6 is an end view of the loading and unloading device, with a portion of a cart shown in phantom.

Referring now to FIGS. 4, 5 and 6, the loading and unloading device 18 is shown in greater detail. These assembly drawings of the loading and unloading device 18 will be referred back to in the following description of the component parts of the device 18.

Figure 7:
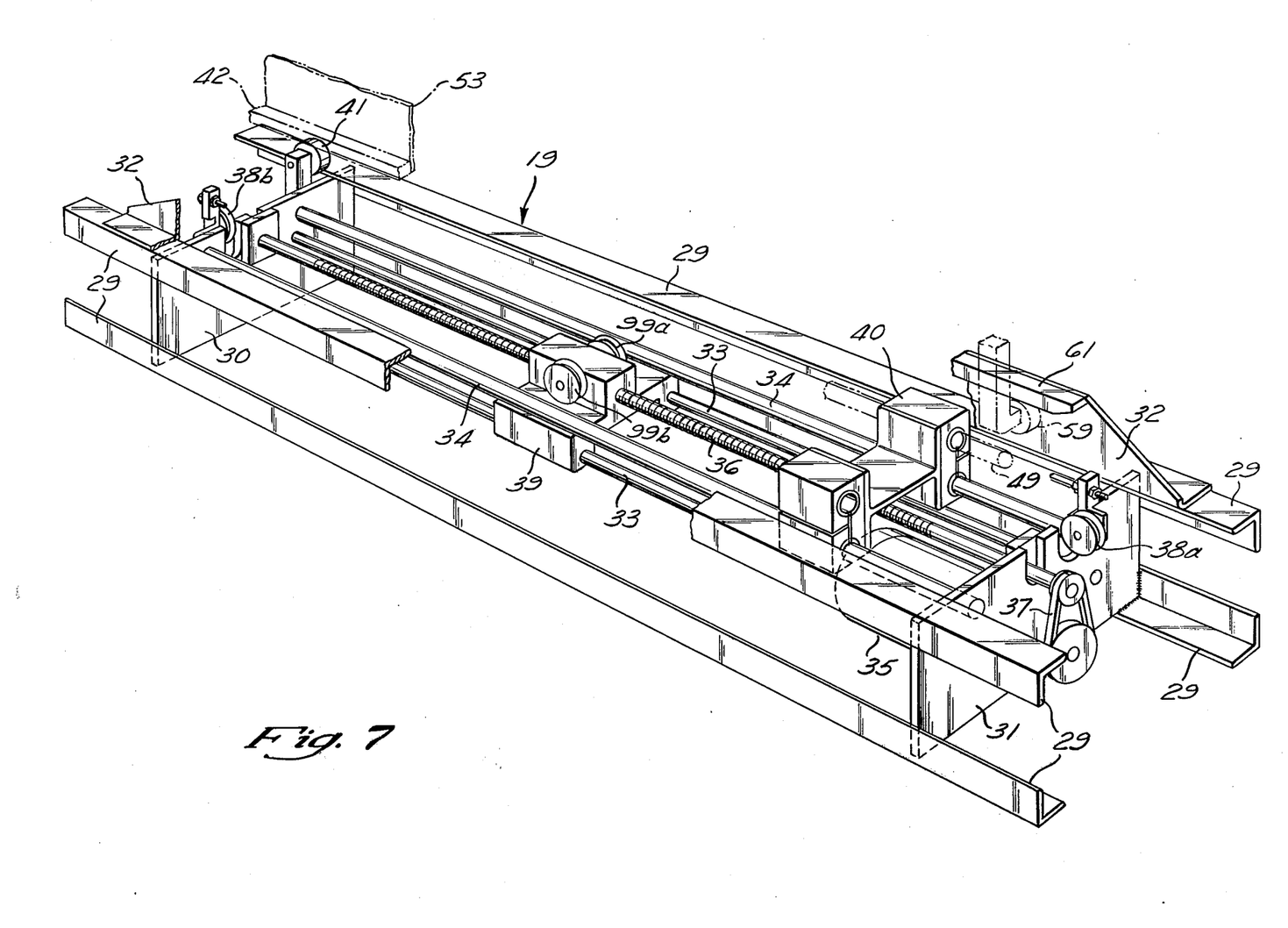
FIG. 7 is a perspctive view of the stationary frame, with one of the two bearing blocks shown in an intermediate position.

Referring now to FIG. 7, the structure of the stationary frame 19 is shown. The stationary frame 19 includes four longitudinally extending bars 29 which define and provide the four corners of the frame 19. The bars 29 are each secured to a left end plate 30 and a right end plate 31 by suitable fasteners such as bolts (not shown). Two L-shaped guards 32 extend longitudinally along the top of the stationary frame 19 to prevent foreign materials from falling into the device 18 between the frame 19 and the main carriage 20. This function of the guards 32 may be seen by reference to FIG. 6.

Referring still to FIG. 7, the stationary frame 19 also includes two sheave carriage guide bars 33 and two main carriage guide bars 34. The guide bars 33 and 34 are all parallel to one another, and each end of each guide bar is secured to its adjacent one of the end plates 30 and 31. The stationary frame 19 also includes an electric motor 35 which powers a drive screw 36, which is a ball screw in the preferred embodiment. The drive screw 36 is rotatably journaled in a bearing block on each of the end plates 30 and 31. A drive belt 37 extends between the output shaft of the electric motor 35 and the drive screw 36.

Still referring to FIG. 7, two primary cable sheaves 38a and 38b, the function of which is explained below, are rotatably journaled on the end plates 30 and 31. A primary cable sheave carriage 39 is slidably disposed on the sheave carriage guide bars 33 and is drivingly connected to the drive screw 36 by a ball nut (not shown). The sheave carriage 39 is disposed at the center of the stationary frame 19 between the end plates 30 and 31 when the main carriage 20 and coupler carriage 21 are in their retracted or center positions shown by solid lines in FIG. 3. A bearing block 40, the structure and function of which is explained below, is slidably disposed on the main carriage guide bars 34. The bearing block 40 shown in FIG. 7 is one of two identical bearing blocks which slidably support the main carriage 29 on the stationary frame 19. The bearing blocks 40 are in positions at opposite ends of the main carriage guide bars 34 adjacent the end parts 30 and 31 as shown in FIG. 4, when the main carriage 20 is in the retracted position shown by solid lines in FIG. 3. Only one of the two bearing blocks 40 is shown in FIG. 7, while both of the bearing blocks 40 are shown in FIG. 4.

The stationary frame 19 also includes four identical steel support rollers 41 for cooperating with the two bearing blocks 40 described above to support the main carriage 20. Although only one of the support rollers 41 is shown in FIG. 7 for clarity, the remaining three support rollers 41 are identically positioned and journaled on the remaining three top outside corners of the end plates 30 and 31. The bottom edge of each of the two main carriage cover plates 53 (FIG. 8) is provided with a plastic bearing strip 42 along its entire longitudinal extent for contacting the four support rollers 41 of the stationary frame 19 in the manner illustrated in FIG. 7 and further described below.

Figure 8:
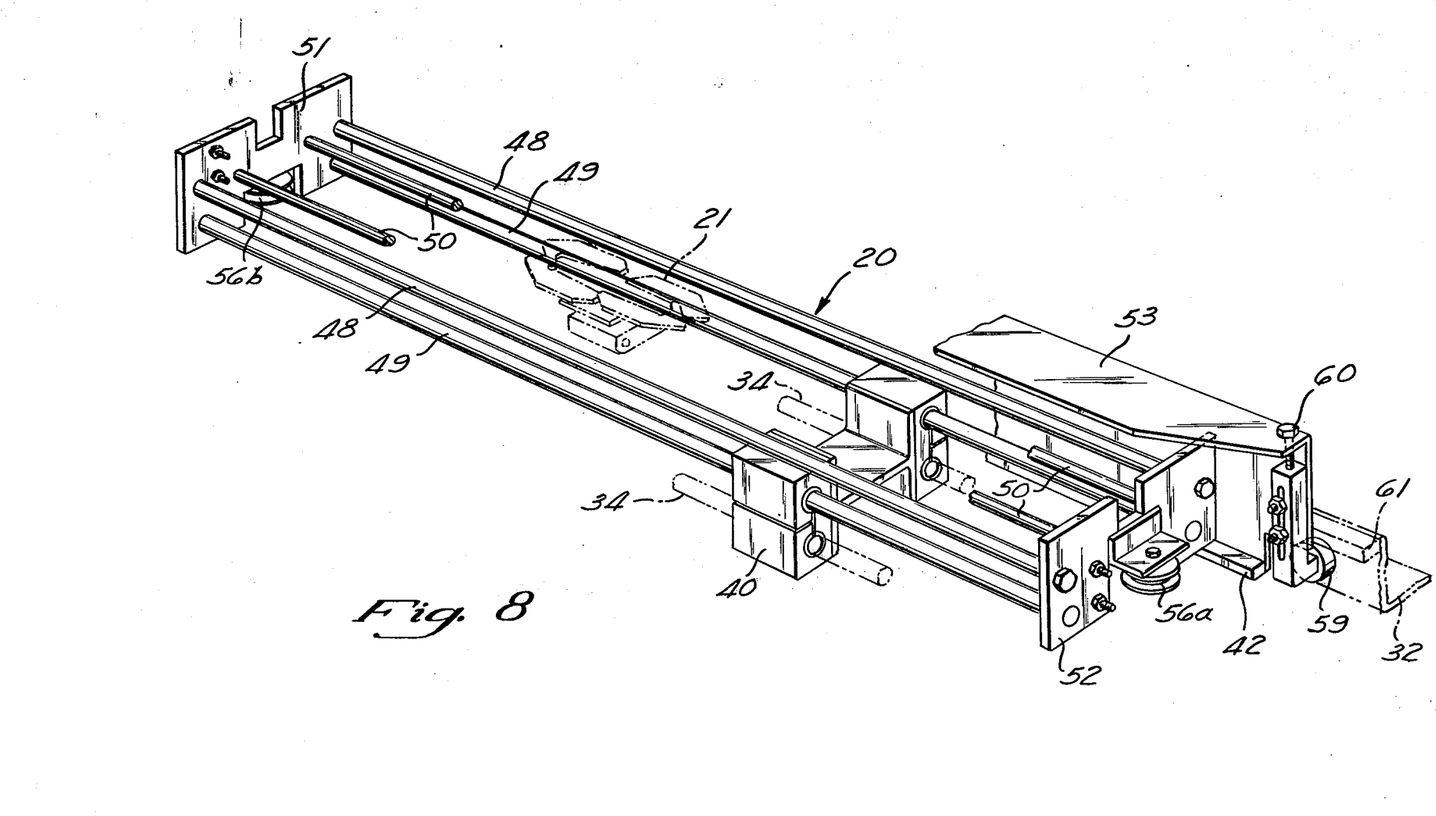
FIG. 8 is a perspctive view of the main carriage, with the coupler carriage shown in phantom and with one of the bearing blocks shown in an intermediate position.

Referring now to FIG. 8, the structural details of the main carriage 20 are shown. The main carriage 20 includes two main support bars 48, two stationary frame guide bars 49, and two coupler carriage guide bars 50. The bars 48, 49 and 50 are all parallel to one another and extend between a left end plate 51 and a right end plate 52. The bars 48, 49 and 50 are each rigidly secured to each of the end plates 51 and 52. Two cover plates 53, only one of which is shown in FIG. 8, are secured to the end plates 51 and 52 for preventing foreign materials from falling into the device 18. As shown in FIG. 5 and further explained below, the cover plates 53 define a tapered entrant throat 54 at each end of the carriage 20 for receiving and aligning the pins 26 of the push carts and a slot 55 in which the pins 26 are received from the throat 54.

Two secondary cable sheaves 56a and 56b are rotatably journaled on the end plates 52 and 51. The coupler carriage 21, shown in phantom in FIG. 8, is slidably disposed on the coupler carriage guide bars 50. The two bearing blocks 40, only one of which is shown in FIG. 8, are slidably disposed on the stationary frame guide bars 49. The position of the bearing blocks 40 relative to the end plates 51 and 52 of the main carriage 20 when the main carriage 20 is in its center position is shown in FIG. 4. Two coupler arm reset cams 57 are rigidly secured to the inside wall of each of the cover plates 53, as shown in FIGS. 4 and 5, for purposes described below. Two coupler arm release plates 58 are also rigidly secured to the inside wall of each of the cover plates 53, as shown in FIGS. 4 and 5, for purposes described below.

As further shown in FIG. 8, the main carriage 20 also includes four identical steel support rollers 59 rotatably journaled on the cover plates 53. Only one of the rollers 59 is illustrated in FIG. 8 for clarity, and the remaining three rollers 59 are identically mounted on the remaining three inside ends of the two cover plates 53. Each of the rollers 59 is mounted for vertical adjustment relative to its cover plate 53 by operation of an adjustment screw 60. The guards 32 are each provided with a plastic bearing strip 61 along their entire longitudinal extent for engaging the support rollers 59 in the manner illustrated in FIG. 8 and further described below.

Figure 9:
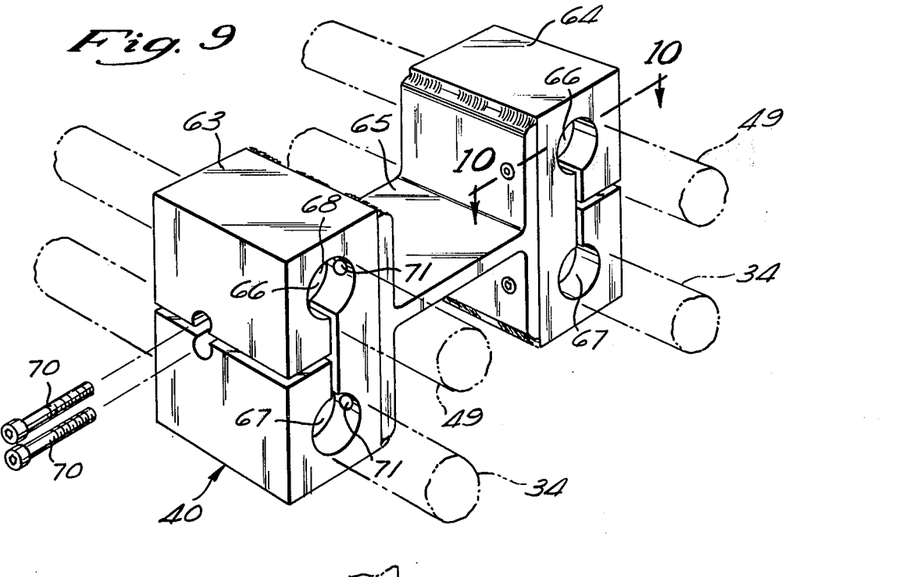
FIG. 9 is a perspective view of one of the two bearing blocks for the loading and unloading device.
Figure 10:
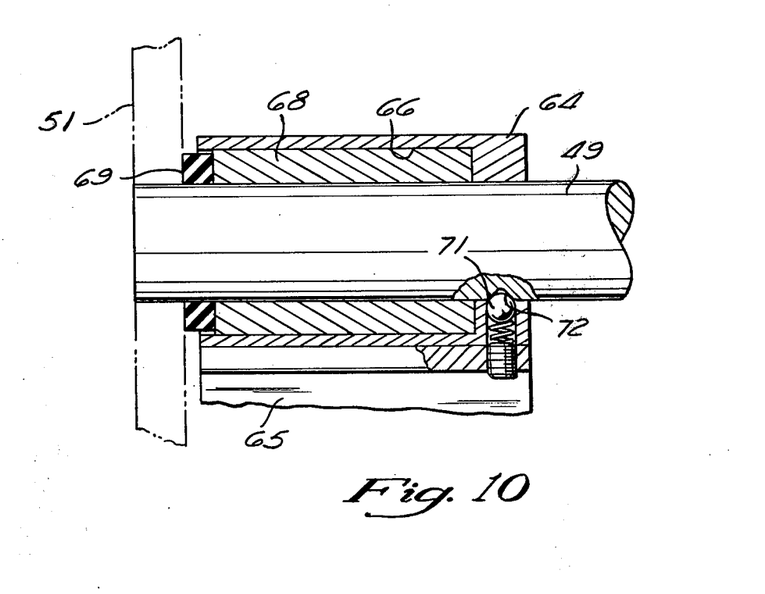
FIG. 10 is a cross-sectional view taken along line 10—10 in FIG. 9.

Referring now to FIGS. 9 and 10, the structural details of the left one of the two bearing blocks 40 are shown. The left and right bearing blocks are identical to one another, but the left bearing block is rotated 180° about a vertical axis passing through its center from the position of the right bearing block. Each bearing block 40 includes two bearing housings 63 and 64 which are rigidly secured to one another by a connecting member 65. Each of the bearing housings 63 and 64 includes an upper counterbore 66 and lower counterbore 67, which receive the bars 49 of the main carriage 20 and the bars 34 of the stationary frame 19, respectively. Each of the counterbores 66 and 67 receives a C-shaped bushing 68 which is held in place by a suitable snap ring (not shown). An annular elastomeric bumper 69 cushions the bearing housing 63 against the end plate 51. The counterbores 66 and 67 are slotted along their longitudinal extent (FIG. 9), and suitable bolts 70 may be tightened to reduce the inside diameter of the counterbores 66 and 67. This reduces the inside diameter of the C-shaped bushings 68 to compensate for wear of the bushings 68.

Each of the counterbores 66 and 67 is also provided with a spring loaded detent ball 71. The detent balls 71 each project into a suitable recess 72 provided on each end of each of the bars 34 and 49 when the main carriage 20 is in its center position. The detents 71 and recesses 72 cooperate to permit relative movement between certain of the bars 34 and 49 and the bearing block 40 when the main carriage 20 is extended to the right or to the left and to hold the bearing blocks 40 in positions adjacent the end plates 51 and 52 as the main carriage 20 is retracted to its center position shown in solid lines in FIG. 3. In this manner, as further discussed below, the bearing blocks 40 provide bearing arrangements spaced a maximum distance apart under all circumstances for providing a cantilever support for the main carriage 20 as the main carriage 20 is extended and retracted.

Figure 11:
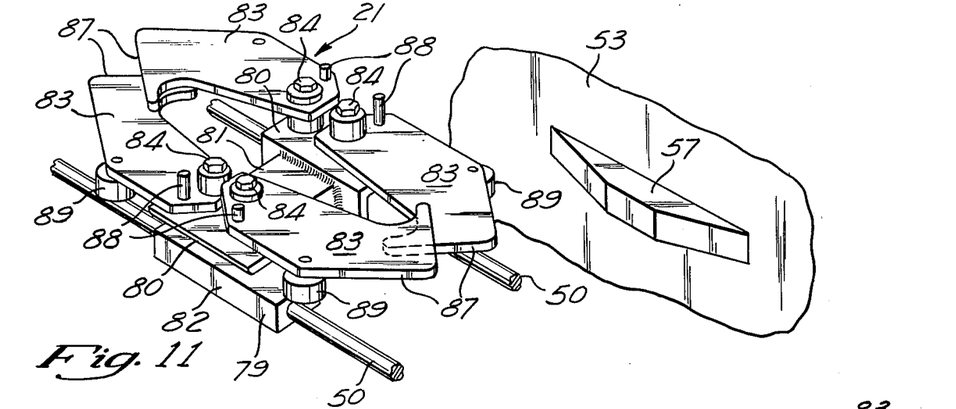
FIG. 11 is a pespective view of the coupler carriage.
Figure 12:
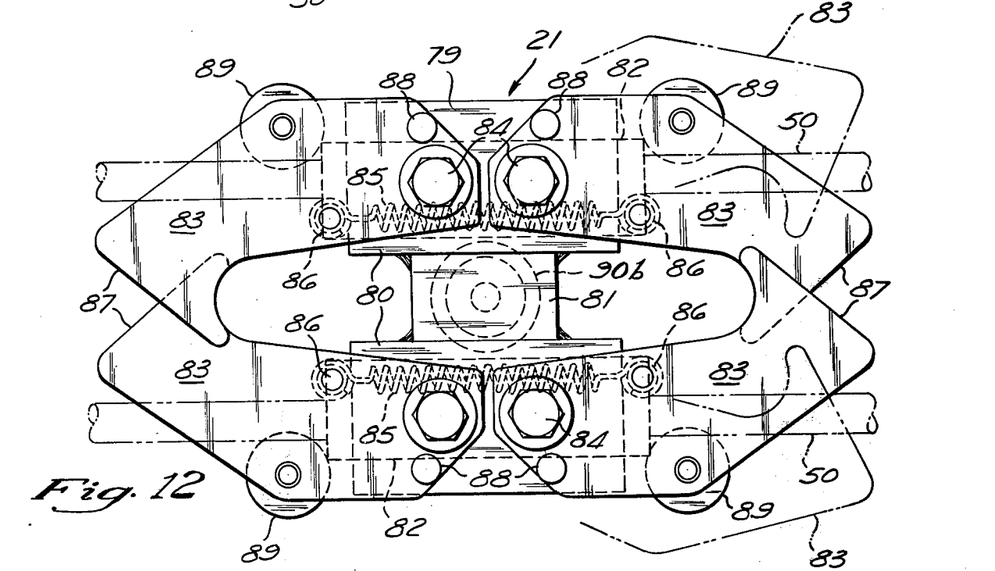
FIG. 12 is a top plan view of the coupler carriage.
Figure 13:
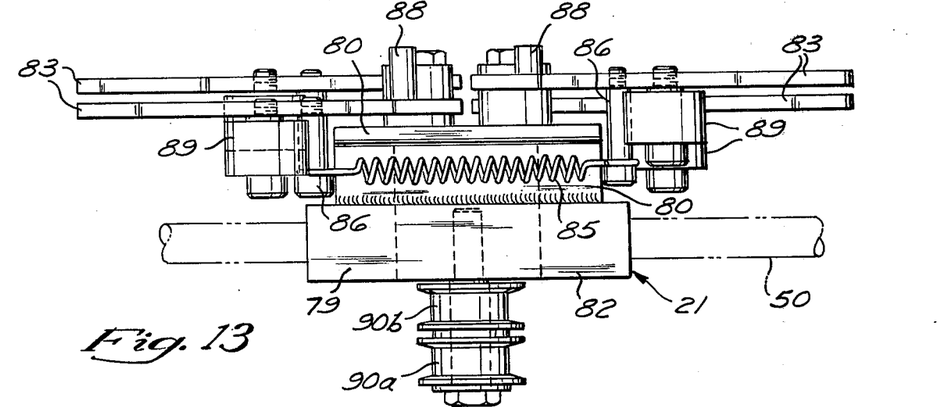
FIG. 13 is a side-elevational view of the coupler carriage.

Referring now to FIGS. 11, 12 and 13, the structural details of the coupler carriage 21 are shown. The coupler carriage 21 incudes a coupler carriage housing 79. The housing 79 includes two 90° angle members 80 welded together and spaced apart by a rectangular block 81. A sleeve 82 is welded to the bottom of each of the 90° angle members 80, and each of the sleeves 82 is slidably disposed on one of the bars 50 of the main carriage 20.

The coupler carriage 21 also includes four coupler arms 83, each of which is pivotally mounted on one of the 90° angle sections by a suitable pivot pin and spacer 84. A spring 85 having its ends secured to the coupler arms 83 by suitable bolts 86 resiliently retains the coupler arms 83 in their closed positions shown in FIGS. 11, 12 and 13 or in the open position shown in phantom in FIG. 12. When the coupler arms 83 are in their closed positions, the springs 85 are inside the pivot pin and spacer assemblies 84 and bias the bolts 86 against the end faces of the angle members 80. When the coupler arms 83 are in the open position shown in phantom in FIG. 12, the springs 85 are laterally outside of the pivot pin and spacer assemblies 84 and, in a similar manner, bias the bolts 86 against the end faces of the angle memebrs 80.

Referring still to FIGS. 11, 12 and 13, the coupler arms 83 each include a first cam opening surface 87, which operates to open the coupler arms 83 when a cart is to be picked up and loaded onto the elevator. When the coupler carriage 21 is being extended in a manner described below to capture the cart, the cam opening surfaces 87 of the leading two coupler arms 83 engage the transfer pins 26 to rotate the coupler arms 83 about the pivot pins 84. This permits the two transfer pins 26 (see FIG. 2) to move into the center slot defined by the four coupler arms 83.

The coupler arms 83 each also include a second cam opening surface 88. The second cam opening surfaces 88 operate to open the coupler arms 83 to release the cart pins 26 when a cart is removed from the elevator. When the main carriage 20 and the coupler carriage 21 reach one of the fully extended positions shown in FIG. 3 with a cart that is being removed from the elevator, the cam opening surfaces 88 of the two leading coupler arms 83 engage the release plates 58 (FIGS. 4 and 5) to rotate the two leading coupler arms 83 to their open positions. This releases the cart from the coupler carriage 21. Then, as the main carriage 20 and coupler carriage 21 retract back toward the center position, a reset wheel 89 on each of the two open coupler arms 83 rides up on one of the reset cams 57 to close the open coupler arms 83 after the open coupler arms 83 have retracted past the cart pins 26 of the cart that has been removed from the elevator.

Referring still to FIGS. 11, 12 and 13, the coupler carriage 21 also includes two secondary cable sheaves 90a and 90b rotatably journaled on the bottom of the block 81 by a suitable axle. The function of the secondary cable sheaves 90a and 90b is further explained below.

Figures 14, 15:
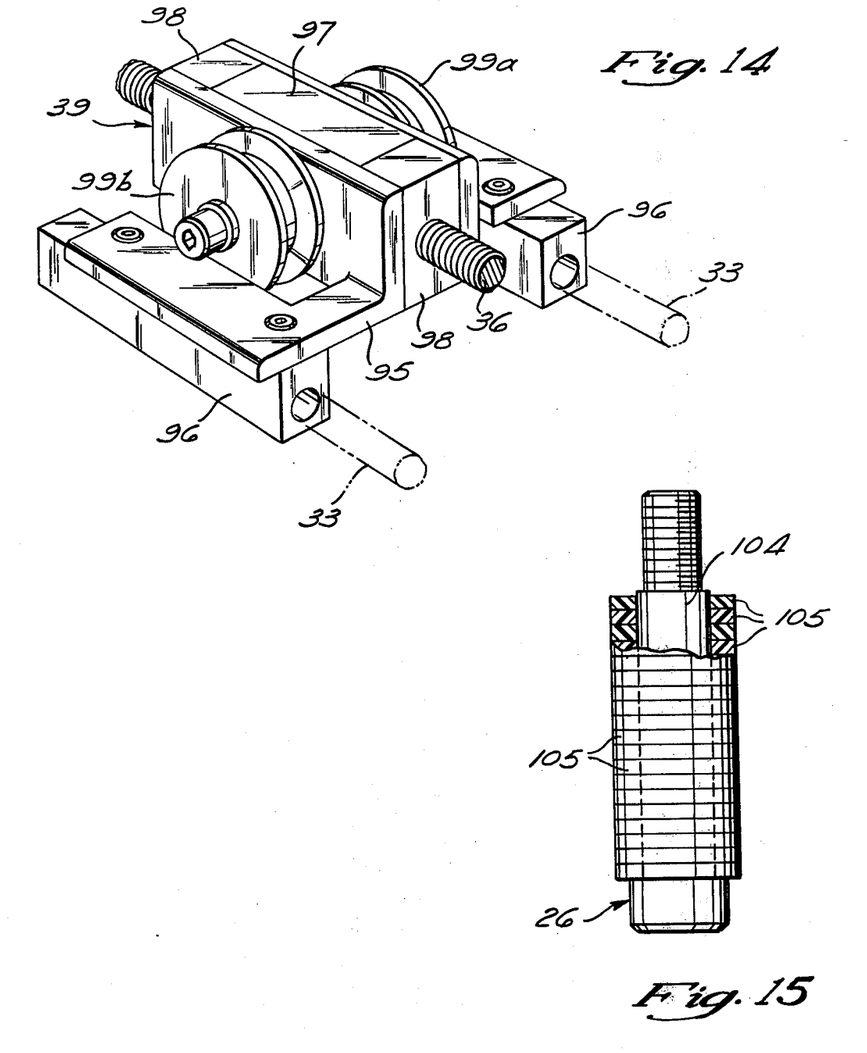
FIG. 14 is a perspective view of the sheave carriage.
FIG. 15 is a perspctive view of a loading pin for the cart shown in FIGS. 1 and 2.

Referring now to FIG. 14, the structural details of the sheave carriage 39 are shown. The sheave carriage 39 includes a main body portion 95. Two sleees 96 are attached to the bottom of the body portion 95 and are slidably disposed on the bars 33 of the stationary frame 19. The sheave carriage 39 also includes a ball nut 97 which is captured between two end plates 98. The ball screw 36 cooperates with the ball nut 97 to displace the sheave carriage 39 as the ball screw 36 is turned by the motor 35. Two primary cable sheaves 99a and 99b are rotatably journaled on the main body portion 95 of the sheave carriage 39.

Referring now to FIG. 15, the preferred embodiment of the cart pin 26 is shown. The pickup pin 26 includes a hexagonal socket head screw 104 having approximately twenty nylon washers rotatably disposed on its outer peripheral surface. As shown in FIG. 4, two of the pickup pins 26 are threadably secured to each cart 25 and are longitudinally spaced apart a sufficient distance that they fit inside the slot defined by the four coupler arms 83 on the coupler carriage 21 (FIG. 11). When the two pins 26 are inside this slot and the coupler carriage 21 is moving, the trailing one of the two pins 26 engages the inside hooked surface of the two trailing arms 83 to prevent the two trailing arms 83 from opening.

Figure 16:
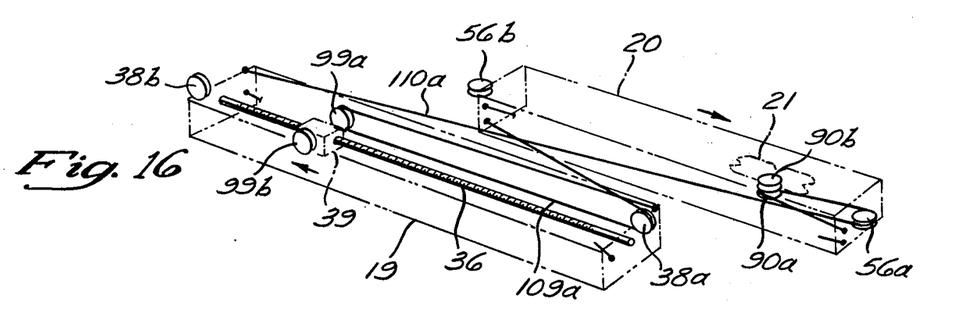
FIG. 16 is a schematic view of a first pair of cables extending the main carriage and the coupler carriage to the right.

Referring now to FIGS. 16 through 19, the operation of the automatic loading and unloading device 18 will now be described. Referring first to FIG. 16, the operation of the machine 18 when the main carriage 20 and coupler carriage 21 are to be displaced to the right from the center position will first be explained. This movement will be the same whether the movement to the right is for the purpose of picking up a cart that is to be loaded onto the elevator or for the purpose of removing a cart from the elevator. However, in the latter case, the main carriage 20 and coupler cariage 21 move farther to the right than in the former case as will also be explained in further detail below.

Still referring to FIG. 16, a first pair of cables for moving the main carriage 20 and coupler carriage 21 to the right includes a primary cable 109a and a secondary cable 110a. The cables 109a and 110a are each number 35 roller chain in the preferred embodiment. The primary cable 109a effects relative longitudinal movement to the right of the main carriage 20 relative to the stationary frame 19. This is accomplished when the drive motor 35 rotates the ball screw 36 in a direction to move the sheave carriage 39 to the left from its center position. As this occurs, movement of the sheave 99a to the left causes the primary cable 109a to pull the main carriage 20 to the right. This movement of the main carriage 20 and its associated sheave 56a causes the secondary cable 110a to pull the coupler carriage 21 to the right relative to the main carriage 20. By this arrangement, the speed and displacement of the coupler carriage 21 to the right relative to the frame 19 is twice the speed and displacement of the main carriage 20 relative to the frame 19.

If a cart is to be picked up and transferred onto the elevator, the movement of the coupler carriage 21 relative to the main carriage 20 terminates before the coupler carriage 21 reaches the release plates 58 (FIG. 5). In this event, the coupler arms 83 open by operation of the rotatable nylon washers of the cart pins 26 on the stationary cart 25 engaging the moving surfaces 87 to admit the cart pins into the coupler carriage 21. On the other hand, if a cart is being transferred from the elevator, the movement of the coupler carriage 21 continues to the right until the surfaces 88 engage the release plates 58 to open the coupler arms 83 (FIG. 5). This difference in the travel of the coupler carriage is determined by suitable microswitches (not shown) activated by movement of the sheave carriage 39.

Figure 17:
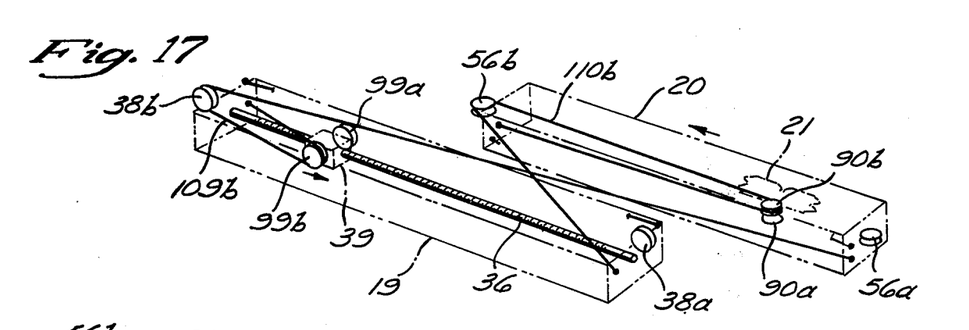
FIG. 17 is a schematic view of a second pair of cables retracting the main carriage and the coupler carriage from the right.

Referring now to FIG. 17, movement of the main carriage 20 and of the coupler carriage 21 to the left to retract from a rightward position after a cart has been picked up or removed will now be explained. This leftward movement is effected by a second pair of cables, which includes a primary cable 109b and a secondary cable 110b which are also number 35 roller chain in the preferred embodiment. Although the cables 109b and 110b are shown in FIG. 17 without the aforementioned cables 109a and 110a described with reference to FIG. 16, this is for the purpose of simpification and it is to be understood that all four cables are provided on the device 18. The retracting movement to the left will be the same whether the retracting movement to the left is for the purpose of retracting the main carriage 20 and coupler carriage 21 after a cart is removed from the elevator or for the purpose of transferring a cart onto the elevator. However, in the former case, the coupler arms 83 are closed during the retracting movement by the reset wheels 89 engaging the reset cam 57.

Still referring to FIG. 17, a primary cable 109b effects relative longitudinal movement to the left of the main carriage 20 relative to the stationary frame 19. This is accomplished when the drive motor 35 rotates the ball screws 36 in a direction to move the sheave carriage 39 to the right toward a center position from its leftward position. As this occurs, movement of the sheave 99b to the right causes the primary cable 109b to pull the main carriage 20 to the left. This movement of the main carriage 20 and its associated sheave 56b causes the secondary cable 110b to pull the coupler carriage 21 to the left relative to the main carriage 20. By this arrangement, the displacement and speed of the coupler carriage 21 to the left relative to the frame 19 is twice the displacement and speed of the main carriage 20 relative to the frame 19.

When the sheave carriage 39 and the main carriage 20 and the coupler carriage 21 all reach a center position relative to the stationary frame 19, a microswitch (not shown) activated by movement of the sheave carriage 39 terminates further movement by terminating electrical power to the motor 35.

Figures 18, 19:
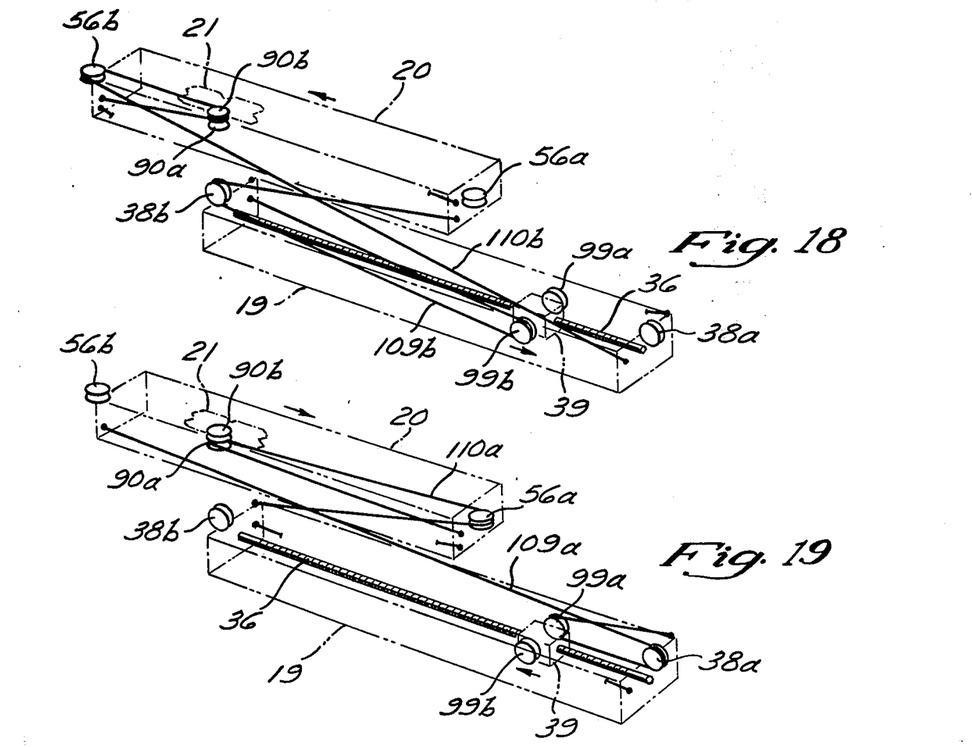
FIG. 18 is a schematic perspective view of the second pair of cables extending the main carriage and coupler carriage to the left.
FIG. 19 is a schematic perspective view showing the first pair of cables retracting the main carriage and coupler carriage from the left.

Referring now to FIG. 18, the operation of the machine 18 when the main carriage 20 and coupler carriage 21 are to be displaced to the left from the center position is illustrated. This leftward movement of the main carriage 20 and coupler carriage 21 is effected by the primary cable 109b and by the secondary cable 110b described above with reference to FIG. 17. The function and operation of the cables 109b and 110b and the sheave carriage 39 during this movement from the center position to the left is identical to the function and operation described above with reference to FIG. 17 during movement from the rightward position to the center. The structure and operation of the coupler arms 83 and of the release plates 58 and reset cams 57 to pick up or discharge a cart during this extension to the left is identical to such structure and operation during extension to the right described above with particular reference to FIG. 16. When the leftward travel is to be terminated, the sheave carriage 39 actuates a microswitch (not shown) in the manner described above with reference to FIG. 16.

Referring now to FIG. 19, the operation of the machine 18 when the main carriage 20 and the coupler carriage 21 are to be retracted from the left to the center position is illustrated. This movement is effected by the primary cable 109a and the secondary cable 110a, which operate in the same manner as described above with reference to FIG. 16. When the sheave carriage 39 and the main carriage 20 and the coupler carriage 21 all reach the center position, a microswitch (not shown) is actuated by the sheave carriage 39 to stop the electric motor 35 and terminate further movement to the right.

Referring now to FIG. 4, the sliding movement of the bearing blocks 40 as the main carriage 20 is extended and retracted will now be explained. When the main carriage 20 is extended to the right as viewed in FIG. 4, the end plate 31 provides an abutment surface which is engaged by the right bearing block 40 so that the right bearing block 40 remains stationary with the stationary frame 19. The left end plate 51 engages the left bearing block 40 and moves the left bearing block 40 with the main carriage 20.

After the main carriage 20 is extended to the right and it is desired to return the main carriage 20 to its center position shown in FIG. 4, it is necessary that the bearing blocks 40 assume the positions shown in FIG. 4 when the carriage returns to its center position. During this retracting movement, the two ball detents 71 of the upper counterbores 66 (FIGS. 9 and 10) secure the left bearing block 40 to the main carriage 20 so that the left bearing block 40 returns to the left as the main carriage 20 is retracted. Similarly, the spring biased ball detent 71 of the two lower counterbores 67 (FIGS. 9 and 10) of the right bearing block 40 secures the right bearing block 40 on the stationary frame 19 so that the right bearing block 40 remains stationary on the stationary frame 19 during this retracting movement of the main carriage 20.

Still referring to FIG. 4, when the main carriage 20 is extended to the left, the left bearing block 40 remains stationary on the frame 19 against the end plate 30 while the right bearing block 40 is engaged by the end pltae 52 and carried to the left with the main carriage 20. When the main carriage 20 is retracted to its center position after the extension to the left, the detents on the upper counterbores 66 of the right bearing block 40 compel the right bearing block 40 to move with the main carriage 20, while the detents in the lower counterbores 67 of the left bearing block 40 compel the left bearing block 40 to remain stationary. In the event of a breakdown or failure of the loading and unloading device 18 so that it does not extend to pick up or unload carts, the device 18 does not interfere with manual loading and unloading of the carts on the elevator 14. In this event, each of the four coupler arms 83 (FIG. 12) is manually moved to its open position. This permits a cart to be manually loaded onto and removed from the elevator 14. During this manual loading and unloading, the two pins 26 of the cart 25 are guided by the entrant throat 54 and the slot (FIG. 5) as the cart 25 is manually moved onto and off of the elevator 14. After the device 18 is repaired, extension of the main carriage 20 and coupler carriage 21 to pick up a cart for loading onto the elevator 14 will cause the coupler arms 83 to be closed by operation of the cams 57 (FIG. 5). Alternatively, the coupler arms 83 may be closed manually after the machine is repaired.

Referring now to FIGS. 3, 7 and 8, the operation of the four support rollers 41 of the stationary frame 19 and of the four support rollers 59 of the main carriage 20 will be explained. When the main carriage 20 is in its neutral or center position, the four support rollers 41 cooperate with the two bearing blocks 40 to support the main carriage 20. The support rollers 59 on the main carriage 21 are inactive when the main carriage 20 is in its center position and are functional only when the main carriage 20 is extended. When the main carriage 20 is extended to the right, the right support rollers 41 of the stationary frame 19 roll on the bottom edge of the two cover plate srips 53 (FIG. 7) of the main carriage 20 to assist the bearing blocks 40 in supporting the main carriage 20. The left two support rollers 41 of the stationary frame 19 are inactive during this extension to the right. As the main carriage 20 is extended to the right, the left two support rollers 59 of the main carriage roll on the bottom surface of the strips 61 (FIG. 8) of the stationary frame to counterbalance the turning moment on the cantilevered carriage 20 and prevent the carriage 20 from sagging. During this movement to the right, the two right support rollers 59 of the main carriage 20 are inactive. When the main carriage 20 is extended to the left, the left two support rollers 41 of the stationary frame 19 and the right two support rollers 59 of the main carriage 20 act in a similar manner to prevent the main carriage 20 from sagging.

What is claimed is:

1. A loading and unloading device comprising a frame stationary with respect to horizontal movement and having a longitudinal horizontal axis and at least one stationary guide bar extending in the longitudinal direction, a main carriage having at least one movable guide bar movable therewith extending parallel to said stationary guide bar, said main carriage having a retracted position with its guide bar extending adjacent said stationary frame, slidable bearing means through which both of said guide bars are slidably disposed and which connect said stationary frame and said main carriage, and permitting said main carriage to extend horizontally from said retracted position, a coupler carriage for engaging and disengaging a vehicle, and bearing means movably supporting said coupler carriage on said main carriage for relative movement therebetween in said longitudinal direction, said slidable bearing means being constructed and arranged to provide vertical cantilevered support for said main carriage and said coupler carriage on said stationary frame when said main carriage is extended from said retracted position.

2. A loading and unloading device as set forth in claim 1, including first roller means acting between said main carriage and said stationary frame and supporting at least a portion of said main carriage on said stationary frame, and second roller means acting between said main carriage and said stationary frame cooperating with said slidable bearing means to counterbalance at least a portion of a moment on said main carriage when said main carriage is extended from said retracted position relative to said stationary frame.

3. A loading and unloading device as set forth in claim 1, including first flexible cable means extending between and connected to said stationary frame and said main carriage, and second flexible cable means extending between and connected to said stationary frame, said main carriage and said coupler carriage, first sheave means being movable on said stationary frame generally along said longitudinal direction, said first cable means being supported on said first sheave means and being arranged to develop a replacement of said main carriage relative to said stationary frame generally equal to twice the displacement of said sheave means on said stationary frame, second sheave means fixed to said coupler carriage, said second cable means being supported on said second sheave means and being arranged to develop a displacement of said coupler carriage on said main carriage generally equal to one half of the displacement of said main carriage on said stationary frame.

4. A loading and unloading device comprising a frame stationary with respect to horizontal movement and having ends spaced along a longitudinal axis, a main carriage having longitudinally spaced ends each generally associated with one of said frame ends when in a retracted position relative to said frame, first bearing means movably mounting said main carriage on said stationary frame for reciprocating movement in either direction parallel to said axis relative to said stationary frame, said first bearing means supporting said main carriage on said stationary frame with one of its ends remote from said stationary frame when the main carriage is moved in the horizontal direction from the retracted position, a coupler carriage for engaging and disengaging a cart, second bearing means movably mounting said coupler carriage on said main carriage for reciprocating movement in either direction parallel to said axis relative to said main carriage, first flexible cable means extending between and connected to said stationary frame and said main carriage, and second flexible cable means extending between and connected to said stationary frame, said coupler carriage and said main carriage, first sheave means driven by a screw drive means and movably disposed on said stationary frame for relative reciprocating movement in either direction generally parallel to said axis, said first cable means being supported on said first sheave means and being arranged to develop a displacement of said main carriage relative to said stationary frame generally equal to twice the displacement of said first sheave means on said stationary frame, second sheave means being fixed to said coupler carriage, said second cable means being supported on said second sheave means and being arranged to develop a displacement of said coupler carriage on said main carriage generally equal to one-half of the displacement of said main carriage on said stationary frame.

5. A loading and unloading device as set forth in claim 4, including power means for causing reciprocating movement of said first sheave means in either direction parallel to said axis relative to said stationary frame.

6. A loading and unloading device as set forth in claim 5, said power means including a drive screw and reversible means rotating said drive screw in either direction.

7. A loading and unloading device as set forth in claim 4, said first bearing means including first and second longitudinally spaced bearing units, each of said bearing units including one bearing surface movably disposed on said stationary frame and another bearing surface movably disposed on said main carriage, each of said bearing units being adjacent a separate end of the main carriage when the main carriage is in said retracted position with respect to said stationary frame.

8. A loading and unloading device comprising a frame stationary with respect to horizontal movement and having a longitudinal axis, a main carriage, first bearing means movably mounting said main carriage on said stationary frame for reciprocating movement in either direction from a center position parallel to said axis relative to said stationary frame, a coupler carriage for engaging and disengaging a cart, second bearing means movably mounting said coupler carriage on said main carriage for reciprocating movement in either direction from a center position parallel to said axis relative to said main carriage, said coupler carriage including a coupler frame and a coupler arm pivotally connected to said coupler frame for movement in a horizontal plane between a closed position and an open position, said coupler arm including first camming surface means for moving said coupler arm from said closed position towards said open position when said coupler carriage is extended in one direction from said center position and said first camming surface radially engages a vertically depending pin of a cart, along substantially any part of its vertical length, a release surface on said main carriage, and second camming surface means on said coupler arm for engaging said release surface and moving said coupler arm from said closed position to said open position when said coupler carriage is fully extended in one direction from said center position relative to said main carriage and spring biasing means for automatically closing said coupler arm when said pin is enclosed by said arm.

9. A loading and unloading device as set forth in claim 8, including third camming surface means on said coupler arm locking said coupler arm in said closed position when said third camming surface means is engaged by a cart and said coupler carriage is moved in a direction back toward said center position.

10. A loading and unloading device as set forth in claim 8, including reset camming surface means on said main carriage for moving said coupler arm to said closed position when said coupler carriage is moved in a direction back toward said center position.

11. In combination, a loading and unloading device and a cart; said cart having a first end and a second end and a bottom, a pair of ground engaging wheels at each of said ends, and a pair of longitudinally spaced cart pins extending downwardly from said bottom between said two pair of wheels; said loading and unloading device comprising a frame stationary with respect to horizontal movement and having a longitudinal axis, a main carriage, first bearing means movably mounting said main carriage on said stationary frame for reciprocating movement in either direction from a center position parallel to said axis relative to said stationary frame, a coupler carriage for engaging and disengaging said cart, second bearing means movably mounting said coupler carriage on said main carriage for reciprocating movement in either direction from a center position parallel to said axis relative to said main carriage, said coupler carriage including a coupler frame and four coupler arms each pivotally connected to said coupler frame for movement in a horizontal plane between a closed position and an open position, said coupler arms each including first camming surface means for moving said coupler arm from said closed position towards said open position when said coupler carriage is extended in one direction from said center position and said first camming surface engages one of said cart pins, a plurality of release surfaces on said main carriage, and second camming surface means on each of said coupler arms longitudinally aligned with one of said release surfaces for engaging said release surface and moving said coupler arm from said closed position to said open position when said coupler carriage is fully extended in one direction from said center position relative to said main carriage said first camming surface means of each coupler arm being operable to move the respective coupler arm towards an open position and into interengagement with one of said cart pins independently of relatively large variations in vertical registration between said first camming surface means and said one cart pin and spring biasing means for automatically closing a pair of said coupler arms when said pin is enclosed by said pair of arms.

12. The combination set forth in claim 11, said four coupler arms cooperatively defining a longitudinally extending elongated slot for receiving both of said cart pins, and each of said coupler arms including third camming surface means longitudinally aligned with said cart pins for being engaged by one of said cart pins and locking said coupler arm in said closed position when cart pins are disposed in said slot.

13. A loading and unloading device as set forth in claim 8, including a plurality of reset camming surface means on said main carriage for moving each of said coupler arms to said closed position when said coupler carriage is moved in a direction back toward said center position.

14. In combination, a loading and unloading device and a cart; said cart having a first end and a second end and a bottom, at least one ground engaging wheel at each of said ends, and a cart pin extending downwardly from said bottom between said wheels; said loading and unloading device comprising a frame stationary with respect to horizontal movement and having a longitudinal axis, a main carriage, first bearing means movably mounting said main carriage on said stationary frame for reciprocating movement in either direction from a center position parallel to said axis relative to said stationary frame, a coupler carriage for engaging and disengaging said cart, second bearing means movably mounting said coupler carriage on said main carriage for reciprocating movement in either direction from a center position parallel to said axis relative to said main carriage, said coupler carriage including a coupler frame and two coupler arms pivotally connected to said coupler frame for movement in a horizontal plane between a closed position and an open position, said coupler arms cooperatively defining an elongated slot when said coupler arms are in said open positions, said coupler arms each including first camming surface means for moving said coupler arm from said closed position towards said open position when said coupler carriage is extended in one direction from said center position and said first camming surface engages said cart pin, a release surface on said main carriage associated with each coupler arm, second camming surface means on each of said coupler arms longitudinally aligned with said release surface for engaging said release surface and moving said coupler arm from said closed position to said open position when said coupler carriage is fully extended in one direction from said center position relative to said main carriage, and means for releaseably holding said coupler arms in said open positions whereby said cart pin may pass freely through said elongated slot when said coupler arms are in their respective open positions and spring biasing means for automatically closing said coupler arms when said pin is enclosed by said arms.

15. A loading and unloading device comprising a frame stationary with respect to horizontal movement and having ends spaced along a longitudinal horizontal axis, a main carriage having longitudinally spaced ends each generally associated with one of said frame ends, first bearing means movably supporting same main carriage on said stationary frame for reciprocating movement relative to said stationary frame in either direction from a center position parallel to said axis, said first bearing means supporting said main carriage on said stationary frame with one or the other of its ends cantilevered when the main carriage is moved in either direction, a coupler carriage for engaging and disengaging a cart, second bearing means movably supporting said coupler carriage on said main carriage for reciprocating movement relative to said main carriage in either direction parallel to said axis, power means for moving said main carriage on said stationary frame and said coupler carriage on said main carriage respectively in the same one of either direction, said first bearing means including first and second longitudinally spaced bearing units, each of said bearing units including one bearing surface movably disposed on said stationary frame and another bearing surface movably disposed on said main carriage, each of said bearing units being generally associated with a separate end of the main carriage when the main carriage is in a centered position with respect to the stationary frame, each of said bearing units including first spring loaded detent means acting between the bearing unit and said stationary frame and second spring loaded detent means acting between the bearing unit and said main carriage, each of said detent means in both directions of movement of the main carriage allowing a bearing unit generally associated with the end of the main carriage opposite a cantilevered end to travel in unison with such end of the main carriage along the stationary frame, while the bearing unit associated with the cantilevered end of the main carriage remains stationary with respect to said stationary frame adjacent an end of said stationary frame closest said cantilevered end.

16. A loading and unloading device comprising a frame stationary with respect to horizontal movement and defining a horizontal longitudinal axis, a carriage mounted on the frame for reciproaction along said axis relative to said frame, a coupler carried by said carriage, said coupler including means for coupling with an element depending from a cart in a coupling zone of said coupler, said coupling means being movable between an active coupling position and inactive non-coupling position, said coupler including means to maintain said coupling means in said active coupling position or in said inactive non-coupling position, means forming an elongated slot extending along said axis in a plane above said coupler and in vertical alignment with said coupler, said slot being dimensioned to allow free longitudinal passage of the depending cart element while laterally restraining said depending cart element along a path parallel to said axis, said coupler being constructed and arranged to allow said slot to be effective to guide the cart along the axial path and into said coupling zone without coupling engagement between said coupler means and depending cart element when said coupler means is in said inactive position, reset means disposed along the path of said coupler, said reset means being constructed and arranged to engage the coupler to overcome the effect of said position maintaining means on the coupling means to automatically shift said coupling means from said inactive position reset means disposed along the path of said coupler, said reset means being constructed and arranged to engage the coupler to overcome the effect of sid position maintaibning means on the coupling means to automatically shift said coupling means from said inactive position to said active position upon movement of said coupler relative to said frame, and spring biasing means for automatically closing said coupling means when said element is enclosed by said coupling means.

17. A device as set forth in claim 16 wherein said coupler is movably mounted on said frame along a path of predetermined length and in a manner permitting it to move relative to said slot forming means.

18. A device as set forth in claim 17 wherein said slot forming means is constructed and arranged to extend over said coupler in any of its positions along its path.

19. A device as set forth in claim 18 wherein said slot forming means is movably mounted on said frame for displacement along said axis.

20. A device as set forth in claim 16 wherein said slot forming means comprises a cover which except for the extent of said slot substantially completely protects said coupler from debris falling vertically or directed horizontally towards said coupler.

* * * * *

UNITED STATES PATENT AND TRADEMARK OFFICE
CERTIFICATE OF CORRECTION

PATENT NO. : 4,148,404
DATED : April 10, 1979
INVENTOR(S) : William C. Heisler

It is certified that error appears in the above-identified patent and that said Letters Patent are hereby corrected as shown below:

Column 1, line 5, "the" should be replaced with --to--.
Column 2, line 46, "perspctive" should read --perspective--.
Column 2, line 48, "perspctive" should read --perspective--.
Column 2, line 56, "perspctive" should read --perspective--.
Column 2, line 60, "perspctive" should read --perspective--.
Column 2, line 61, "perspctive" should read --perspective--.
Column 4, line 1, "similarly" should read --Similarly--.
Column 4, line 54, "parts" should read --plates--.
Column 6, lines 41 & 42, "memebrs" should read --members--.
Column 7, line 12, "sleees" should read --sleeves--.
Column 9, line 51, "pltae" should read --plate--.
Column 10, line 21, "srips" should read --strips--.
Column 11, line 51, "being" should be deleted.
Column 15, line 10, delete "reset means".
    lines 11-14 should be deleted.
    line 15, "coupling means from said inactive position" should be deleted.

Signed and Sealed this

Second Day of October 1979

[SEAL]

Attest:

RUTH C. MASON
Attesting Officer

LUTRELLE F. PARKER
Acting Commissioner of Patents and Trademarks